United States Patent
Xu

(10) Patent No.: US 6,421,085 B1
(45) Date of Patent: Jul. 16, 2002

(54) HIGH SPEED CMOS IMAGER COLUMN CDS CIRCUIT

(75) Inventor: Weize Xu, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/059,814

(22) Filed: Apr. 14, 1998

(51) Int. Cl.[7] .................... H04N 3/14; H04N 5/335
(52) U.S. Cl. .................. 348/308; 348/303; 348/307; 348/302; 348/304
(58) Field of Search .................. 348/302, 303, 348/304, 305, 306, 307, 308, 309, 310

(56) References Cited

U.S. PATENT DOCUMENTS

| | | | |
|---|---|---|---|
| 4,035,629 A | 7/1977 | Lampe et al. | 235/193 |
| 4,528,595 A * | 7/1985 | Eouzan | 358/213 |
| 4,549,215 A | 10/1985 | Levine | 358/213 |
| 4,588,950 A | 5/1986 | Henley | 324/158 |
| 4,608,606 A | 8/1986 | Levine | 358/213 |
| 4,649,430 A | 3/1987 | Hynecek | 358/213 |
| 4,652,766 A | 3/1987 | Wang et al. | 250/578 |
| 4,683,580 A | 7/1987 | Matsunaga | 377/60 |
| 4,809,075 A | 2/1989 | Akimoto et al. | 358/213.18 |
| 4,841,480 A | 6/1989 | Lampe et al. | 365/87 |
| 5,027,148 A | 6/1991 | Anagnostopoulos | 354/402 |
| 5,086,344 A | 2/1992 | D'Luna et al. | 358/213.15 |
| 5,113,254 A | 5/1992 | Kanno et al. | 358/98 |
| 5,146,339 A * | 9/1992 | Shinohara et al. | 358/212 |
| 5,153,731 A * | 10/1992 | Nagasaki et al. | 348/304 |
| 5,434,619 A * | 7/1995 | Yonemoto | 348/303 |
| 5,434,620 A | 7/1995 | Higuchi et al. | 348/308 |
| 5,449,908 A | 9/1995 | Wadsworth et al. | 250/332 |
| 5,471,515 A | 11/1995 | Fossum et al. | 377/60 |
| 5,493,122 A | 2/1996 | Farr | 250/370.06 |
| 5,572,155 A | 11/1996 | Tamayama | 327/94 |
| 5,572,255 A * | 11/1996 | Murakami et al. | 348/302 |
| 5,574,284 A | 11/1996 | Farr | 250/370.06 |
| 5,600,696 A | 2/1997 | Sauer | 377/60 |
| 5,892,540 A * | 4/1999 | Kozlowski et al. | 348/303 |
| 5,933,189 A * | 8/1999 | Nomura | 348/302 |
| 5,969,758 A * | 10/1999 | Sauer et al. | 348/308 |
| 6,046,444 A * | 4/2000 | Afghahi | 348/303 |
| 6,130,423 A * | 10/2000 | Brehmer et al. | 348/308 |
| 6,166,769 A * | 12/2000 | Yonemoto et al. | 348/308 |
| 6,201,573 B1 * | 3/2001 | Mizuno | 348/308 |
| 6,222,175 B1 * | 4/2001 | Krymski | 348/302 |

FOREIGN PATENT DOCUMENTS

EP 0 481 373 A2 4/1992 ............ H04N/3/15

OTHER PUBLICATIONS

Kyomasu, Mikio; Aug. 1991; IEEE Journal, vol. 26, No. 8; "A new MOS imager Using Photodiode as Current Source".*

* cited by examiner

Primary Examiner—Wendy R. Garber
Assistant Examiner—John M. Villecco
(74) Attorney, Agent, or Firm—Peyton C. Watkins

(57) ABSTRACT

A correlated double sampling unit within a CMOS imager employs an image sensor having a plurality of photodetectors arranged in a series of rows and columns with a row addressing circuit, a column addressing circuit, a first sample and hold circuit allocated for each of the columns, a transfer circuit operatively connecting each of the columns to the first sample and hold circuit for each of the columns, and a plurality of second sample and hold circuits, each of the second sample and hold circuits being operatively connected to a subset of the first sample and hold circuits.

14 Claims, 4 Drawing Sheets

HIGH SPEED CMOS IMAGER COLUMN CDS CIRCUIT

FIELD OF THE INVENTION

The present invention relates to CMOS imagers and, more particularly, to correlated double sampling circuits employed by CMOS imagers.

BACKGROUND OF THE INVENTION

Present solid-state image sensors are created from essentially three different technologies. Self-scanned diode array; charge injection device (CID) arrays; and charge-coupled device (CCD) arrays. Each of these three technologies will be produced by a semiconductor process that has inherent limitations which limit the achievement of higher integration. The art of solid state image sensors has evolved to the point where a CMOS process can be employed in the production of solid state image sensors. The use of CMOS technology allows higher integration resulting in both analog and digital circuits being integrated within the same silicon chip as the sensor array. Higher integration, additionally, allows for the achievement of higher resolution and higher speed. During normal use, hundreds of different signals, representing individual channels are simultaneously present at the output of the sensor array. These signals need to be processed and then converted into a digital signal. However, process variations (which exist in any of the processes used to manufacture these devices and cannot be eliminated) create offsets between the various circuits that are dedicated to the individual columns generating what is referred to as "column pattern noise" or "fixed pattern noise".

Imaging systems desiring high resolution and high speed, such as 10-bit resolution, 24 frame per second, need to have "fixed pattern noise" removed before analog to digital conversion can be performed for any large size image array. Prior art devices typically employ a double sampling circuit for each column within a sensor to remove fixed pattern noise. These prior art correlated double sampling circuits allocate a double sampling circuit for every column and as a result have disadvantages in terms of: higher power dissipation; slower speed; only a partial removal of fixed pattern noise; more silicon area needed to provide a double sampling for each column; a more complicated process involved to create the additional circuitry; and higher cost.

From the foregoing discussion, it should be apparent that there remains a need within the art for a method and apparatus that can be employed within a CMOS environment to perform CDS without requiring large amounts of silicon area and power. These and other problems are addressed by the present invention as discussed below.

SUMMARY OF THE INVENTION

The present invention pertains to a new Column Correlated Double Sampling (CDS) circuit that provides double sampling for each column by placing the first sampling circuit in the column itself and the second sampling circuit is shared between the various columns resulting in doubling sampling circuit that requires much less silicon space, is more economical to produce, requires less power dissipation, operates at higher speeds, improves the removal of fixed pattern noise, and requires less process steps to create than prior art devices.

The CDS circuit of the present invention is intended to satisfy various design parameters, including: very small size; a 70% increase in speed; lower power dissipation; and more importantly, a substantial reduction in fixed pattern noise compared to prior art devices. Except for the standard control clocks, including a reset clock, a signal clock and a column select clock, no other control clocks are required. These standard clocks are those typically required for any imager array application employing a semiconductor based imager and can be provided by a relatively simple digital control circuit. The CDS circuit as envisioned by the present invention can run at speeds as high as 30 million samples/second with power dissipation less than 13 mW (for 1200 column array). The present invention, potentially, removes up to 100% of the fixed pattern noise.

These and other features and advantages of the present invention are provided by a correlated double sampling unit comprising: an image sensor having a plurality of photodetectors arranged in a series of rows and columns; a row addressing circuit; a column addressing circuit; a first sample and hold circuit allocated for each of the columns; a transfer circuit operatively connecting each of the columns to the sample and hold circuit that is allocated to that column; and a plurality of second sample and hold circuits, each of the second sample and hold circuits being operatively connected to a subset of the first sample and hold circuits.

DETAILED DESCRIPTION OF THE INVENTION

Figure 1:
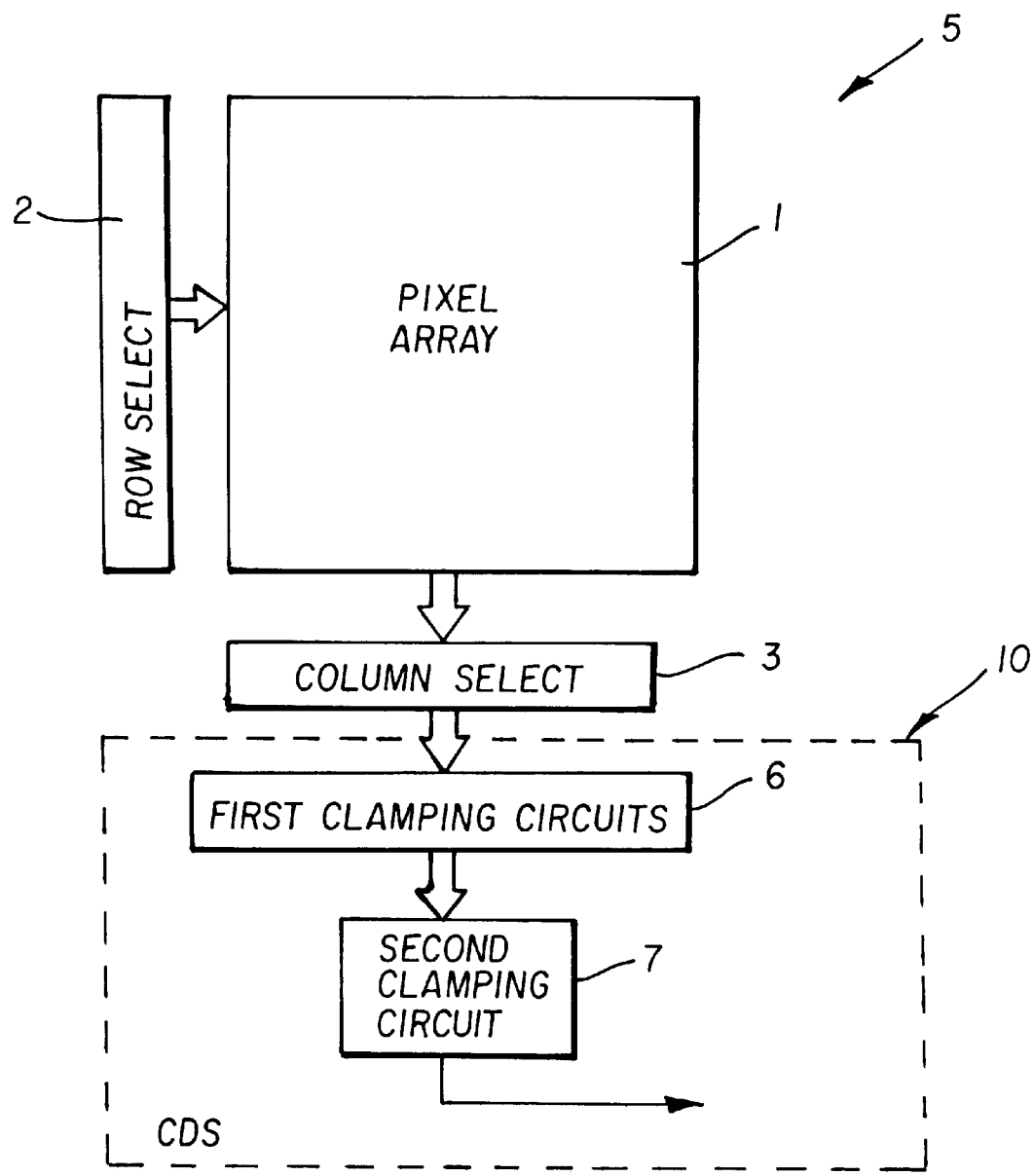
FIG. 1 is a diagram of an image sensor embodying the preferred embodiment of the invention.

FIG. 1 represents the preferred embodiment of the present invention, which is a CMOS based image sensor 5 on a signal silicon chip. The sensor 5 has an array of pixels 1 arranged in a plurality of rows and columns which can be individually selected by row select circuit 2 and column select circuit 3. Each column has its pixels double sampled by correlated double sampling circuit 10 (CDS). Collectively, first sampling circuits 6 and second sampling circuits 7 comprise the correlated double sampling unit 10. Columns have pixels initially sampled by a plurality of 1st sampling circuits 6 that are arranged such that is one 1st sampling circuit for each of the columns. After an initial sampling is provided by the 1st sampling circuits 6, second sampling circuits 7 will perform a second sampling of each of the column outputs.

Figure 2:
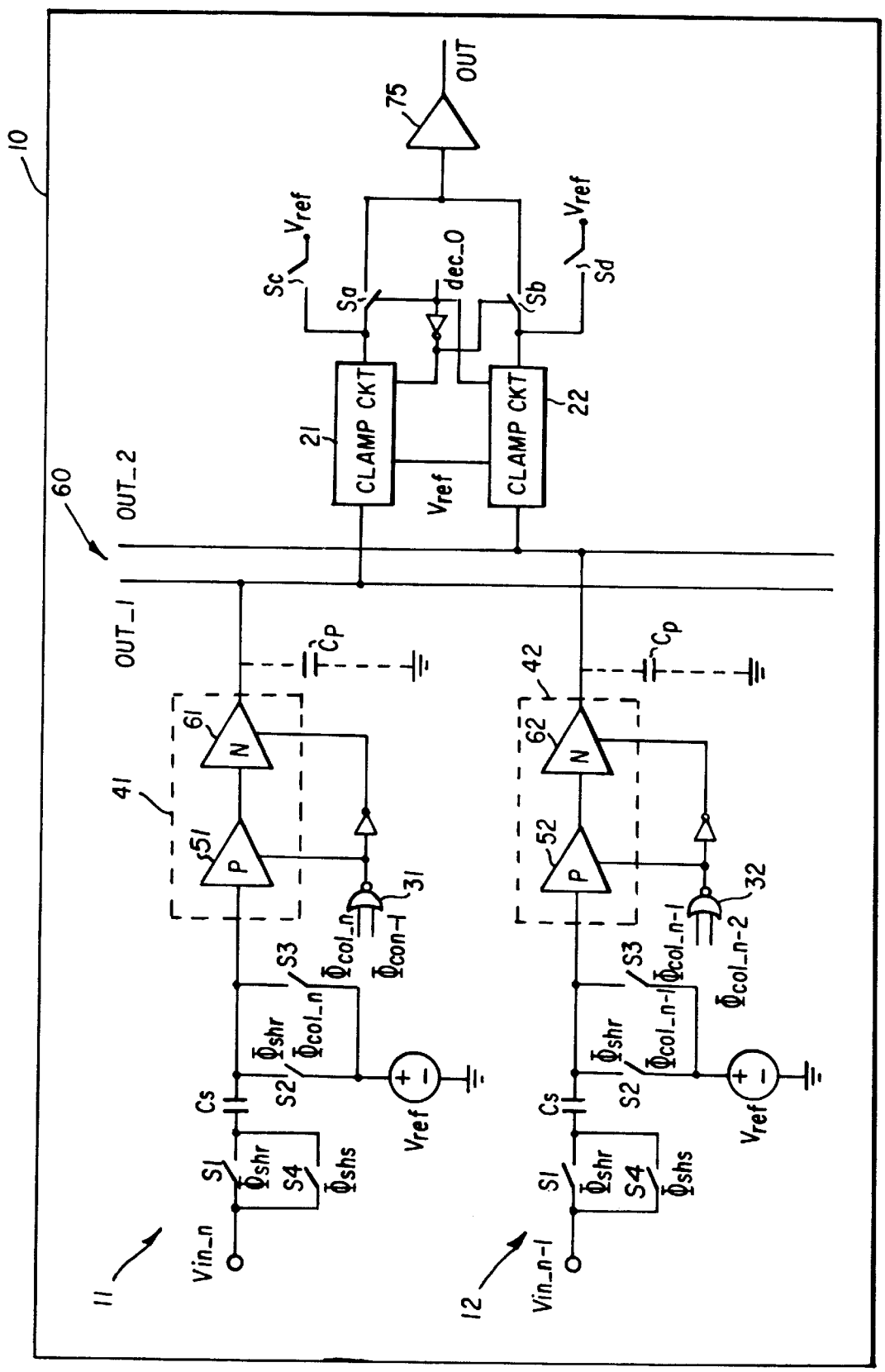
FIG. 2 is a schematic diagram of the correlated double sampling unit of the present invention.

FIG. 2 is a schematic diagram for the double correlated double sampling circuit 10 that illustrates one of the first clamping circuit 6 for each of the odd and even columns. The odd column first clamping circuit 11 and even column first clamping circuit 12, are identical and operate, respectively, with odd column second clamping circuit 21 and even column second clamping circuit 22. FIG. 2 shows single odd and even first clamping circuits 11, 12, for purpose of illustration only. First clamping circuits 6 are provided such there is one first clamping circuit for each column. The preferred embodiment employs only a single second clamping circuit 21 for the odd columns and a single second clamping circuit 22 for the even columns. However, it should be noted that numerous combinations of the number of second clamping circuits 7 with first clamping circuit 6 can be employed and that FIG. 2 only illustrates the preferred embodiment. The reasons for the selection of second clamping circuit 21, 22 for the odd and even columns, respectively, will be discussed further below.

Referring now to FIG. 1 in conjunction with FIG. 2, signals from image sensor 1 are provided to the CDS 10 once row select circuit 2 identifies a row of columns that are addressed. An entire addressed row of pixels have their stored photo-generated charges transferred into first sampling circuits 6 where their respective charges can be addressed on a column by column basis. Each column has a first clamping circuit associated with it such that there will be 1, 2, 3 ... n−1, n first clamping circuits 6, where n is the number of columns in the image sensor 1. First clamping circuits 11, 12 in FIG. 2 are representative of first clamping circuits 6, while only first clamping circuits 11, 12 are shown there are n first clamping circuits 6 equal to the number of columns as stated above. Electrical signals representative of the charges stored within the pixels will be output from the selected rows to nodes $Vin_n$ and $Vin_{n-1}$, within first clamping circuits 11, 12 of the correlated double sampling unit 10 to sample and hold these signals.

Figure 3:
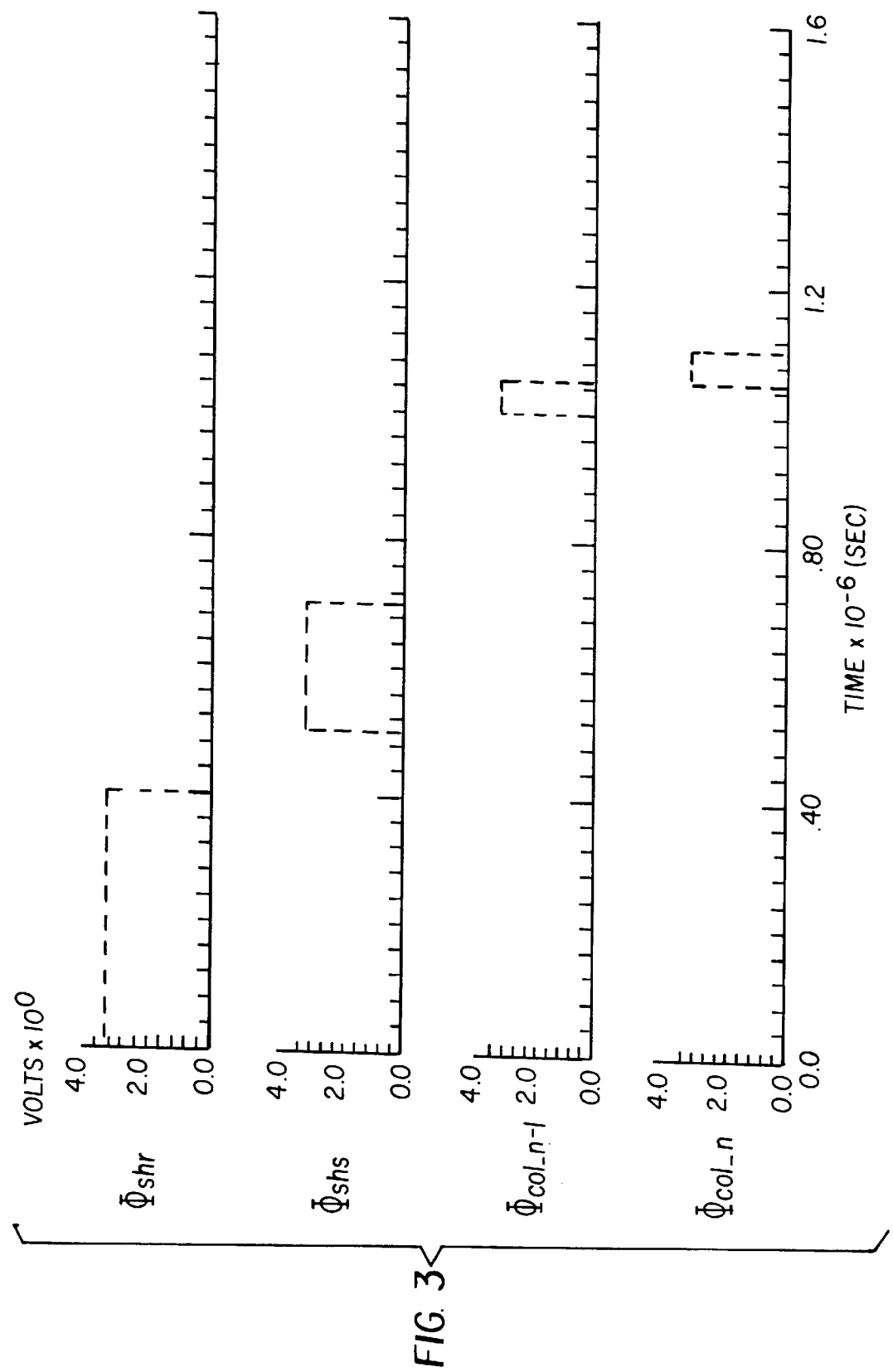
FIG. 3 is an illustration of the control clocks used by the present invention.
Figure 4:
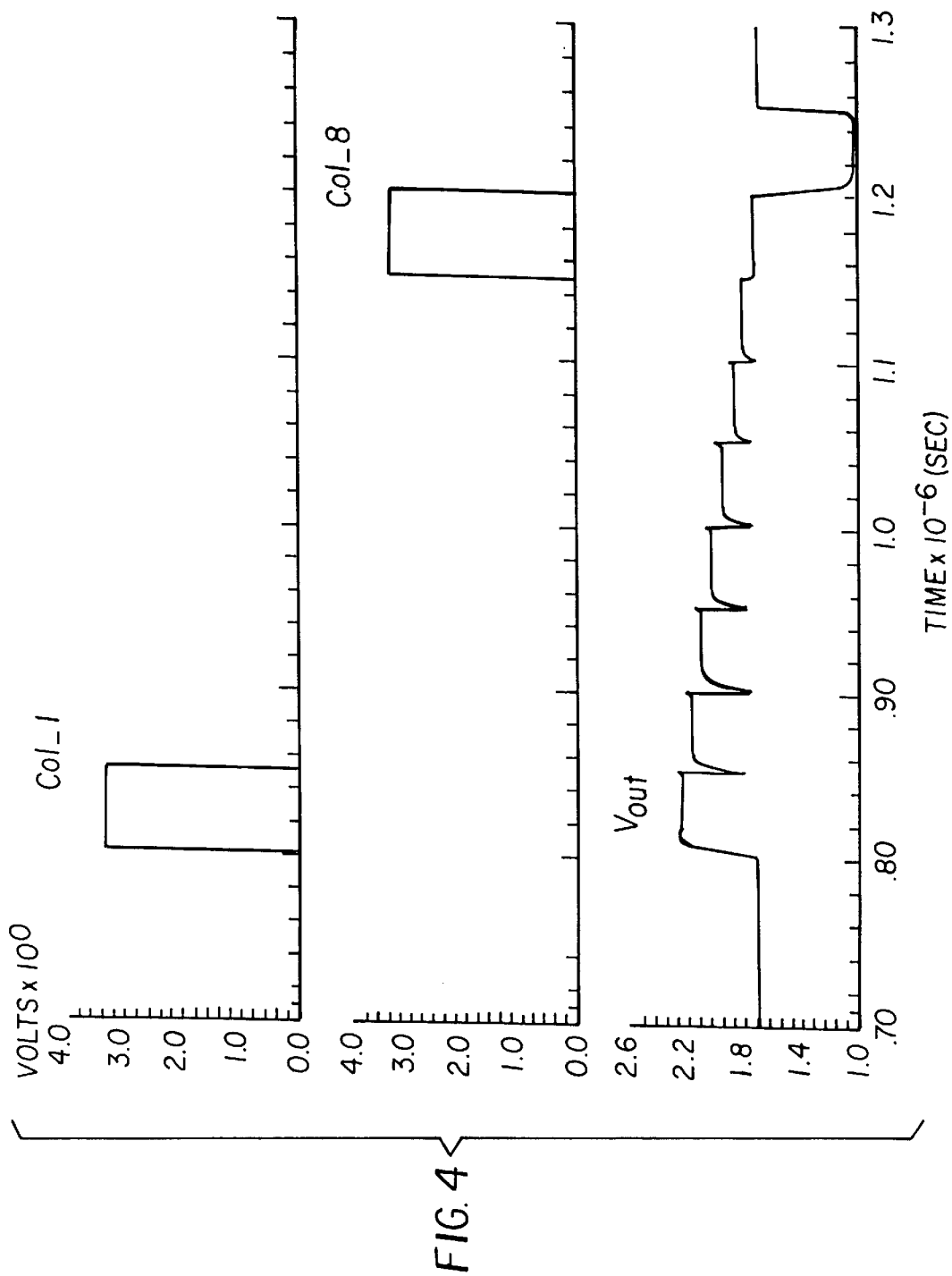
FIG. 4 is an illustration of the output waveforms as envisioned by the present invention.

Referring now to the timing diagram in FIG. 3, which illustrates clocking signals used in conjunction with the Correlated Double Sampling Unit 10 as shown in FIG. 2, the clocking signals employ CMOS clocking levels in the vicinity of 3 volts to the signals present at nodes $Vin_n$ and $Vin_{n-1}$ to provide sampling references for the CDS 10. The references used with correlated double sampling unit 10 are (1) the reset value of each pixel which provides a reference value for that pixel; and (2) the actual signal level of that same pixel. A capacitor $C_s$ is provided within each of the first clamping circuits 11, 12 for the storage of charge representative of the signals on nodes $Vin_{n-1}$, $Vin_n$, respectively. A reset value is obtained as a reference for each pixel after the sample hold reset signal, $\phi_{shr}$, is applied to all the pixels in a given row. The sample hold reset signal, $\phi_{shr}$, is also applied as an active high clock to each of switches S1, S2 to close switches S1, S2. Closure of switch S1 in each of the n first clamping units 6 (only two first clamping units 11, 12 are shown) results in the signals currently at the Vin nodes being applied to that side of the capacitor $C_s$ adjacent to the Vin node. Closure of switch S2 results in the opposite side of the capacitor $C_s$ having the reference voltage $V_{ref}$ applied to it resulting in a voltage across capacitor $C_s$ equal to $V_{ref}-V_{in}$ after the resetting of any given pixel. In FIG. 2 it should be understood that switches S1, S2, S3, S4 Sa and Sb are conventional transistor configuration.

Still referring to FIG. 2 in conjunction with FIG. 3, switch S3 is provided for each of the first clamping circuits 11, 12. S3 will only close when that respective column has been selected. For example the S3 switch for the nth column will close when $\phi_{col\_n}$ (which in the preferred embodiment is an active high clocking signal) is applied to S3 to indicate that the nth column has been selected. When the respective column is not selected, S3 remains open preventing the reference signal $V_{ref}$ from reaching the input to linear gain circuit 41. The first clamping circuits 11, 12 provide for an initial sampling of signals $Vin_n$, $Vin_{n-1}$, respectively. Once the signals $Vin_n$, $Vin_{n-1}$ have been sampled, they are input to an input to the first stage of a linear gain circuit which comprises a PMOS source follower. The second stage of the linear gain amplifier is NMOS source follower.

The reset voltage level of any pixel is first stored in capacitor $C_s$ by applying reset signal, clock $\phi_{shr}$, on switches S1 and S2 which closes these switches resulting in reset voltage level being applied to one side capacitor $C_s$ and clamping the side of the capacitor $C_s$ on the same node as the PMOS source follower input to the d.c. voltage of Vref. The voltage across $C_s$ is then $V_{ref}-V_{shr}$. Clock $\phi_{shr}$, then goes low resulting in the opening of switches S1 and S2 allowing Capacitor $C_s$ to float with the voltage across it remaining at $V_{ref}-V_{shr}$. Signal clock $\phi_{sig}$, is then applied to switch S4 (as seen in FIG. 3) closing switch S4 resulting in the application of the signal voltage level of the pixel to the input node of capacitor $C_s$.

During normal operation, when Column N−1 is being read, the first clamping unit 12 is placed in what is called the OUTPUT phase, wherein it will output to the second clamping unit 22 associated with the first clamping unit 12. While Column N−1 is in the output phase, $V_{ref}$ is applied to the input of PMOS source follower 52 by the closing of switch Sb. Also $V_{ref}$ is inhibited from being applied to OUTPUT Buffer 75 by opening switch $S_d$ at the output side of second clamping circuit 22, this allows the charge already stored in the second clamping circuit to be applied to the OUT Buffer 75.

The next column to be read is Column N, which is placed in what is termed the SETTLING phase. In the SETTLING phase, $S_2$ for first clamping circuit 11 is left open allowing the output of capacitor $C_s$ for first clamping circuit 11 to apply its stored charge to the input to PMOS source follower 51. NMOS source follower 61 within the linear gain amplifier 41 for Column N will be precharging the metal lines used on column bus 60, OUT_1, to overcome the parasitic capacitance $C_p$ that is inherent in the metal lines. More importantly in terms of the present invention, in the SETTLING phase, switch $S_a$ is left open isolating the second clamping circuit 21 from the OUTPUT Buffer 75, and switch $S_c$ is closed applying $V_{ref}$ to the output side of the second clamping circuit 21. Thus when the NMOS source follower 61 for the linear gain amplifier 41 precharges the output bus OUT_1, the capacitor within the second clamp circuit 21 is precharged with respect to $V_{ref}$ on its output side. To facilitate these design parameters, digital logic 31, 32 enables the linear gain amplifiers 41, 42 for both the present and the next column to be read out. Therefore, the linear gain amplifiers 41, 42 for both Columns N−1 and N will be enabled when Column N−1 is in the OUTPUT phase and Column N is in the SETTLING phase by decoding the column select signals $\phi_{col\_n-1}$, $\phi_{col\_n}$ (for columns N−1 and N) via NOR gates 31, 32. The digital logic uses the status of the current column being read and the next column to be read into a state wherein the linear gain amplifiers for both the present column being read and the next column being read are enabled. This basic scheme is repeated for each of the columns to increase the throughput of CDS 10.

As previously stated, after the occurrence of the $\phi_{shr}$, clock the voltage across the capacitor $C_s$, is $V_{ref}-V_{shr}$. Switches S1, S2, S3, and S4 remain open leaving capacitor $C_s$ floating, meaning that the accumulated charge in the capacitor has no dissipation path and therefore, remains the same which is $Q_1=C_s*(V_{ref}-V_{shr})$. Accordingly, if $V_x$ is allowed to represent the value of the voltage at the output side of the capacitor $C_s$, after clock $\phi_{sig}$ is applied to switch S4 and $V_{sig}$ is the signal potential received at the Vin node, then the charge $Q_2=C_s*(V_x-V_{sig})$ is equal the charge of $Q_1=C_s*(V_{ref-Vshr})$ since the charge stored in the floating capacitor $C_s$ remains constant because the node on PMOS input side of capacitor $C_s$ is floating. Therefore, $V_x=V_{ref}-V_{shr}+V_{sig}$ or $V_{ref}-(V_{shr}-V_{sig})$, is the potential level present at the input of each of the PMOS source followers.

Linear gain amplifiers 41, 42 have at least one PMOS source follower circuit 51, 52 and at least one NMOS source follower circuit 61, 62 to provide for level shift and voltage gain compensation. In the preferred embodiment, the linear gain amplifiers 41, 42 employ PMOS source follower circuits 51, 52 with small P-type transistors which reduce the signal error caused by transistor gate capacitance and NMOS source followers circuits 61, 62 large N-type transistors and functions as a buffer to drive the large capacitive load of column output circuits out$_1$, out$_2$ which precharge and drive these output circuits out$_1$, out$_2$ and the second clamping circuits 21, 22. It shooed be understood that other configurations of CDS 10 may employ different designs due to different design parameters. For example the preferred embodiment of the present invention employs only second clamping circuits 21, 22, one for each the odd and even columns. Other configurations employing a greater number of second clamping circuits would result in less capacitive load that is required to be driven and result different design considerations. These design modifications and others will be obvious to those skilled in the art. It should also be understood that while linear gain amplifiers are employed by the present invention, usage of different amplifiers is also envisioned and the linear gain amplifiers themselves, while part of the preferred embodiment are not a critical element of the present invention.

As stated above, during the time period when $\phi_{col(N-1)}$ is high Column N−1 is in the OUTPUT phase and Column N is in the SETTLING phase, resulting in the linear gain amplifiers 41, 42 for both Column N−1 and Column N being enabled. However switch S3 is enabled only for that column that is in the OUTPUT phase, Column N−1, which places the $V_{ref}$ potential level at the input to the PMOS source follower 52, resulting in a voltage output on to the Out_2 Bus as shown by Equation 1.

$$\text{Vout\_2} = \beta \cdot \gamma \cdot V_{ref} + \gamma \cdot \Delta_p + \Delta_N \quad \text{Equation 1}$$

where β is the voltage gain of PMOS source follower, γ is the voltage gain of NMOS source follower, and Δp and ΔN are offsets for the PMOS and NMOS source followers, respectively. The offsets, Δp and ΔN, are D.C. values that are process dependent and vary widely by up to 20% from transistor to transistor and is a primary reason for employing capacitors Cs to store a difference in voltages with respect to a reset value.

During that period when $\phi_{col(N-1)}$ is high and Column N−1 is in the OUTPUT phase placing the potential shown by Equation 1 on to the Out_2 bus, switch $S_B$ is closed by Dec_0 which is the least significant bit of the column address buss and the charge storage in the second clamping circuit 22 is being read out of the capacitor within the second clamping circuit 22 to OUT Buffer 75 yielding an output as shown by Equation 2.

$$V_{out}32\ V_{ref} + \beta \cdot \gamma \cdot [V_{shr}(N-1) - V_{sig}(N-1)] \quad \text{Equation 2}$$

Concurrently, with Column N−1 being in the OUTPUT phase as shown by the relationships in Equation 1 and Equation 2, Column N is in the SETTLING phase precharging the inherent parasitic capacitance $C_p$. in the bus lines for the Column OUT_2 Bus, and also precharging the capacitive second clamping circuit 21 with the initially clamped signal stored in capacitor $C_s$ representative of the charge stored within the N−1 column pixel signal ready for being selected. The charge stored in the clamp capacitor inside second clamp circuit 21 is shown by Equation 3.

$$Q = C \cdot \{V_{ref} - \beta \cdot \gamma \cdot V_{ref} + \beta \cdot \gamma \cdot [V_{shr}(N) - V_{sig}(N)] - \gamma \cdot \Delta_p - \Delta_N\} \quad \text{Equation 3}$$

In the SETTLING phase, switches S2 and S3 of first clamping circuit 11 for Column N are left open leaving the input node of the PMOS source follower 51 floating at the level of the voltage drop across capacitor $C_s$, which is set to $V_{ref} - V_{shr} + V_{sig}$, as previously discussed this is the potential level set after the occurrence of the clocks $\phi_{shr}$ and $\phi_{sig}$ NMOS source follower 61 then drives the Channel OUT_1 Bus to a voltage level as shown by Equation 4:

$$V_{out\_1} = \beta \gamma \cdot [V_{ref} - (V_{rst}(N) - V_{sig}(N))] + \gamma \cdot \Delta_p + \Delta_N \quad \text{Equation 4}$$

where β and γ are voltage gains of the NMOS and PMOS source followers, and $\Delta_p$, $\Delta_N$ are the offsets of NMOS and PMOS source follower similar to the case for the Column N above.

In the next cycle, Column N will be in the OUTPUT phase, with $\phi_{col\_N}$ "HIGH", both Column N and Column (N+1) are selected. The Nth column is in the OUTPUT phase and the (N+1)th column is in the SETTLING phase. The $S_a$ switch selects the second clamping circuit 21 which places the charge stored within the internal capacitor in the second clamping circuit 21 to the OUT Buffer 75 generating the output voltage for CDS 10 as shown by Equation 5.

$$V_{out} = V_{ref} + \beta \cdot \gamma \cdot [V_{shr}(N) - V_{sig}(N)] \quad \text{Equation 5}$$

Concurrently with the output as shown in Equation 5, the capacitor within the second clamping circuit 22 for Column N+1 is charged in accordance with Equation 6.

$$Q = C \cdot \{V_{ref} - \beta \cdot \gamma \cdot [V_{shr}(N+1) - V_{sig}(N+1)] - \gamma \cdot \Delta_p - \Delta_N\} \quad \text{Equation 6}$$

In the manner discussed above, each pixel for each column will output through OUTPUT Buffer 75 to a single analog to digital converter. A CMOS based imager conventional employs a great deal of silicon space for analog to digital converters. Additional space is required in conventional devices for second clamping circuits that are typically provided for each column. The present invention not only greatly reduces the number of second clamping circuits but also allows for the provision of only a single analog to digital converter. After the pixels for every column in a given row are output, the next row is selected and the pixels for that column are output as discussed previously.

As previously stated, the linear gain amplifiers 41, 42 for the preferred embodiment employs large transistor NMOS source followers 61, 62 and small transistor based PMOS source followers 51, 52. Output buffer 75 in the preferred embodiment is also a large transistor NMOS source follower that can generate a 1 mA current with the voltage generated from charged stored within the second clamping circuits 21, 22. The timing of the CDS 10 is such that initially clamped charge provided to the input of PMOS source followers 51, 52 will reach there respective second clamping circuit 21, 22 within 20 nanoseconds. The charge held within the second clamping circuits 21, 22 will (in the OUTPUT phase) arrive at the output of the OUTPUT Buffer within 5 nanoseconds. The signal based current that is available at the OUTPUT Buffer 75 will be valid for 25 nanoseconds within the preferred embodiment. This yields a total delay of 30 nanoseconds from the selected second clamping circuit (21 or 22) through OUTPUT Buffer 75 which is in accordance with the sampling frequency of 30 million samples that is envisioned by the preferred embodiment. It will be understood by those skilled in the art that capacitors $C_s$ and capacitive second clamping circuits 21, 22 have no discharge path with the exception of leakage current, therefore, all charge stored in these circuits will be retained as long as the reference voltage $V_{ref}$ is not applied to reset the voltage across the capacitor. Accordingly, the above discussed timing is for the preferred embodiment, however, numerous timing configurations will be readily apparent to those skilled in the art.

In the preferred embodiment that has been detailed herein, the CMOS power supply voltage is on the order of 3–3.3 volts and $V_{ref}$ is envisioned to be approximately 1.8 volts. This value of $V_{ref}$ is envisioned to provide the proper amount of level shift to the input to the PMOS source followers within the linear gain amplifiers as disclosed, herein. It will be readily apparent that other CMOS devices within the prior art will have 5 volt power supplies and future CMOS devices will have power supply voltages on the order of 1.5–1.6 volts and that embodiments of the present invention within these CMOS devices would have a $V_{ref}$ equal to 0.8–0.9 volts and the size of the transistors used to make the PMOS source followers would then vary accordingly.

The foregoing description has detailed the embodiments most preferred by the inventor. However, numerous variations will be obvious to those skilled in the art, accordingly, the scope of in invention should be measured by the appended claims.

Parts List

| | |
|---|---|
| 1 | pixels |
| 2 | row select circuit |
| 3 | column select circuit |
| 5 | image sensor |
| 6 | first clamping circuits |
| 7 | second clamping circuits |
| 10 | correlated double sampling (CDS) |
| 11 | first clamping circuit |
| 12 | first clamping circuit |
| 21 | second clamping circuit |
| 22 | second clamping circuit |
| 31 | digital logic |
| 32 | digital logic |
| 41 | linear gain amplifier |
| 42 | linear gain amplifier |
| 51 | PMOS source follower |
| 52 | PMOS source follower |
| 60 | column bus |
| 61 | NMOS source follower |
| 62 | NMOS source follower |
| 75 | OUTPUT Buffer |
| $C_s$ | sampling capacitor |
| $C_p$ | parasitic capacitance |
| S1 | switch |
| S2 | switch |
| S3 | switch |
| S4 | switch |
| Sa | switch |
| Sb | switch |
| Sc | switch |
| Sd | switch |
| $V_{in}$ | input voltage |
| $Vin_n$ | input node |
| $Vin_{n-1}$ | input node |
| $V_{ref}$ | reference voltage |
| $V_{shr}$ | sample hold reset voltage level |
| $\phi_{sig}$ | signal clock |
| $\phi_{shr}$ | sample hold reset clock |
| $\phi_{col\_n}$ | Column N clock |
| $\phi_{col\_n-1}$ | Column N-1 clock |

What is claimed is:

1. A CMOS imager having a correlated double sampling unit comprising:
   an image sensor having a plurality of photodetectors arranged in a series of rows and columns;
   a row addressing circuit;
   a column addressing circuit;
   a first sample and hold circuit allocated for each of the columns;
   a transfer circuit operatively connecting each of the columns to the first sample and hold circuit for each of the columns;
   a plurality of second sample and hold circuits, each of the second sample and hold circuits being operatively connected to a subset of the first sample and hold circuits;
   a linear gain amplifier contained in each of the first sample and hold circuits; and
   an enabling circuit that enables the linear gain amplifiers for the column that is currently being readout and the column that is to be readout after the column currently being readout;
   wherein the enabling circuit enables the linear gain amplifier for the column to be read next after the column that is currently being read to precharge conductive lines connecting the second sample and hold circuit to the first sample and hold circuit within the column to be read out next.

2. The correlated double sampling unit of claim 1 further comprising an output driver configured to a selection circuit which will output from only one of the second sampling circuits.

3. The correlated double sampling unit of claim 1 wherein only one of the columns is being readout at a given time.

4. The correlated double sampling circuit of claim 1 wherein there are two second sample and hold circuits, each of the second sample and hold circuits are associated with, essentially, half of the first sample and hold circuits.

5. The correlated double sampling circuit of claim 4 wherein the two second sample and hold circuits are arranged such that each of the second sample and hold circuits are associated with alternating columns.

6. The correlated double sampling circuit of claim 1 further comprising a precharge circuit that precharges the second sample and hold circuit.

7. The correlated double sampling circuit of claim 6 further comprising a readout circuit that reads charge stored within the second clamping circuit concurrently with the precharge circuit placing charge within the second sample and hold circuit.

8. A method of making a CMOS imager having a correlated double sampling unit comprising:
   providing a CMOS image sensor having a plurality of photodetectors arranged in a series of rows and columns with a row addressing circuit for addressing the rows, a column addressing circuit for addressing the columns, a first sample and hold circuit allocated for each of the columns and a transfer circuit operatively connecting each of the columns to the first sample and hold circuit for each of the columns;
   additionally providing a plurality of second sample and hold circuits, each of the second sample and hold circuits being operatively connected to a subset of the first sample and hold circuits;
   providing a linear gain amplifier contained within each of the first sample and hold circuits; and
   providing an enabling circuit that enables the linear gain amplifiers for the column that is currently being readout as well as the column that is to be readout after the column that is currently being readout and providing the enabling circuit such that it enables the linear gain amplifier for the column to be read after the column that is currently being read to precharge conductive lines connecting the second sample and hold circuit to the first sample and hold circuit within the column to be read out next.

9. The method of claim 8 wherein the step of additionally providing further comprises providing an output driver configured to a selection circuit such that the output driver is operatively connected to only one of the second sampling circuits at a given time.

10. The method of claim 8 wherein the step of additionally providing further comprises means for reading out only one of the columns at a given time.

11. The method of claim 8 wherein the additionally providing step further comprises providing second sampling circuit such that there are two second sample and hold circuits, and each of the second sample and hold circuits are associated with, essentially, half of the first sample and hold circuits.

12. The method of claim 11 wherein the additionally providing step further comprises providing the two second sample and hold circuits such that they are arranged with each of the second sample and hold circuits being associated with alternating columns.

13. The method of claim 8 wherein the providing step further comprises a precharge circuit that precharges the second sample and hold circuit.

14. The method of claim 13 wherein the providing step further comprises providing a readout circuit that reads charge stored within the second clamping circuit concurrently with the precharge circuit placing charge within the second sample and hold circuit.

* * * * *